United States Patent [19]

Suda et al.

[11] 4,326,207
[45] Apr. 20, 1982

[54] PROGRAMMABLE SEQUENCE CONTROLLER

[75] Inventors: Hiroharu Suda, Yokohama; Keiji Hideshima, Fujisawa; Kazuyoshi Asada, Hitachi; Masaoki Takaki, Hitachi; Isao Yasuda, Hitachi; Atsutaro Kamei, Katsuta, all of Japan

[73] Assignees: Hitachi, Ltd.; Nissan Motor Co., Ltd., both of Tokyo, Japan

[21] Appl. No.: 139,760

[22] Filed: Apr. 14, 1980

Related U.S. Application Data

[63] Continuation of Ser. No. 906,986, May 17, 1978, abandoned.

[30] Foreign Application Priority Data

Nov. 18, 1977 [JP] Japan .............................. 52-137920

[51] Int. Cl.³ .......................... G05B 19/12; G06F 9/06
[52] U.S. Cl. .................................................. 364/900
[58] Field of Search ........................ 364/900 MS File

[56] References Cited

U.S. PATENT DOCUMENTS

| | | | |
|---|---|---|---|
| 3,275,988 | 9/1966 | Yetter | 364/900 |
| 3,434,115 | 3/1969 | Chomicki | 364/900 |
| 3,744,029 | 7/1973 | Nyman | 364/900 |
| 3,828,317 | 8/1974 | Mette | 364/900 |
| 3,832,696 | 8/1974 | Nakao et al. | 364/900 |
| 3,939,453 | 2/1976 | Schroeder | 364/900 |
| 3,944,987 | 3/1976 | Koyanagi et al. | 364/900 |
| 3,974,484 | 8/1976 | Strueer et al. | 364/900 |
| 3,978,454 | 8/1976 | Willard | 364/900 |
| 3,996,565 | 12/1976 | Nakao et al. | 364/900 |
| 4,048,622 | 9/1977 | Yomogina | 364/900 |

Primary Examiner—Gareth D. Shaw
Assistant Examiner—C. T. Bartz
Attorney, Agent, or Firm—Craig and Antonelli

[57] ABSTRACT

A sequence control system includes a main memory unit for storing therein a sequence program, an operation and control unit for decoding the sequence instruction and executing the designated operations, an input unit for fetching states of a process to be controlled as inputs, and an output unit for producing an output signal to control the process.

7 Claims, 11 Drawing Figures

FIG. 10

| ORDER | INSTRUCTION | NUMBER | PROCESSINGS |
|---|---|---|---|
| 1 | ⊣⊢ | 001 | $X_{001} \cdot SQAC \to SQAC$ |
| 2 | ⊢ | 0 | $SQAC \to R_0$ |
| 3 | ⊣⊢ | 002 | $X_{002} \cdot SQAC \to SQAC$ |
| 4 | ⊣⊢ | 003 | $X_{003} \cdot SQAC \to SQAC$ |
| 5 | ⌐ | 2 | (1) $SQAC \to R_2$ <br> (2) $1 \to SQAC$ |
| 6 | ⊥ | 0 | $R_0 \to SQAC$ |
| 7 | ⊣⊢ | 004 | $X_{004} \cdot SQAC \to SQAC$ |
| 8 | ⊢ | 1 | $SQAC \to R_1$ |
| 9 | ⊣⊢ | 005 | $X_{005} \cdot SQAC \to SQAC$ |
| 10 | ⊢ | 2 | $SQAC + R_2 \to R_2, SQAC$ |
| 11 | ⊣⊢ | 006 | $X_{006} \cdot SQAC \to SQAC$ |
| 12 | ⌐ | 3 | (1) $SQAC \to R_2$ <br> (2) $1 \to SQAC$ |
| 13 | ⌐ | 1 | $R_1 \to SQAC$ |
| 14 | ⊣⊢ | 007 | $X_{007} \cdot SQAC \to SQAC$ |
| 15 | ⊢ | 3 | $SQAC + R_2 \to R_2, SQAC$ |
| 16 | ○ | 008 | (1) $SQAC \to Y_{008}$ <br> (2) $1 \to SQAC$ |
| 17 | ⌐ | 0 | $R_0 \to SQAC$ |
| 18 | ○ | 009 | (1) $SQAC \to Y_{009}$ <br> (2) $1 \to SQAC$ |

FIG. 8

| NO. | INSTRUCTION | | PROCESSINGS |
|---|---|---|---|
| 1 | CONTACTS | ⊣⊢ | $X \cdot SQAC \to SQAC$ |
| 2 | OUTPUTS | ○ | (1) $SQAC \to Y$ <br> (2) $1 \to SQAC$ |
| 3 | | ⌐ | $R_i \to SQAC$ |
| 4 | | ⊥ | $R_i \to SQAC$ |
| 5 | | ⊢ | (1) $SQAC \to R_i$ <br> (2) $1 \to SQAC$ |
| 6 | | ⊢ | $SQAC \to R_i$ |
| 7 | | ⌐ | (1) $SQAC + R_i \to R_i$ <br> (2) $1 \to SQAC$ |
| 8 | | ⊢ | $SQAC + R_i \to R_i, SQAC$ |
| 9 | | ⊢ | $SQAC + R_i \to R_i, SQAC$ |

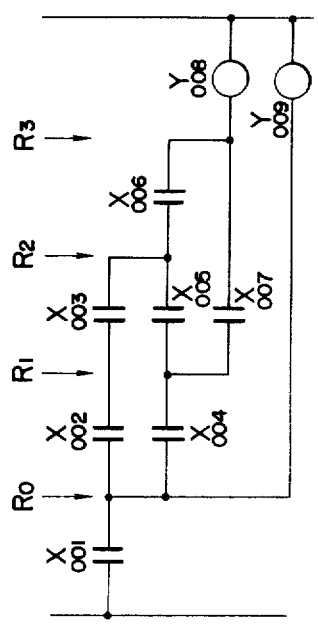

| ORDER | INSTRUCTION | SQAC | OUT | R0 | R1 | R2 | R3 |
|---|---|---|---|---|---|---|---|
| | INITIAL VALUE | | | | | | |
| 1 | X001 —⊥⊦— | — | — | — | — | — | — |
| 2 | R0 —⊥•— | X001 | — | — | — | — | — |
| 3 | X002 —⊥⊦— | X001 | — | X001 | — | — | — |
| 4 | X003 —⊥⊦— | X001·X002 | — | X001 | — | — | — |
| 5 | R2 ⎿— | X001·X002·X003 | — | X001 | — | — | — |
| 6 | R0 —⊥•— | — | — | X001 | — | X001·X002·X003 | — |
| 7 | X004 —⊥⊦— | X001 | — | X001 | — | X001·X002·X003 | — |
| 8 | R1 —⊥•— | X001·X004 | — | X001 | — | X001·X002·X003 | — |
| 9 | X005 —⊥⊦— | X001·X004 | — | X001 | X001·X004 | X001·X002·X003 | — |
| 10 | R2 ⎿— | X001·X004·X005 | — | X001 | X001·X004 | X001·X002·X003 | — |
| 11 | X006 —⊥⊦— | X001·X004·X005+ X001·X002·X003 | — | X001 | X001·X004 | X001·X004·X005+ X001·X002·X003 | — |
| 12 | R3 ⎿— | {X001·X004·X005+ X001·X002·X003}·X006 | — | X001 | X001·X004 | X001·X004·X005+ X001·X002·X003 | — |
| 13 | R1 —⊥•— | — | — | X001 | X001·X004 | X001·X004·X005+ X001·X002·X003 | {X001·X004·X005+ X001·X002·X003}·X006 |
| 14 | X007 —⊥⊦— | X001·X004 | — | X001 | X001·X004 | X001·X004·X005+ X001·X002·X003 | {X001·X004·X005+ X001·X002·X003}·X006 |
| 15 | R3 ⎿— | X001·X004·X007 | — | X001 | X001·X004 | X001·X004·X005+ X001·X002·X003 | {X001·X004·X005+ X001·X002·X003}·X006 |
| 16 | Y008 —○— | — | {X001·X004·X005+X001·X002·X003} ·X006+X001·X004·X007 | X001 | X001·X004 | X001·X004·X005+ X001·X002·X003 | {X001·X004·X005+ X001·X002·X003}·X006+ X001·X004·X007 |
| 17 | Y009 —○— | X001 | — | X001 | X001·X004 | X001·X004·X005+ X001·X002·X003 | {X001·X004·X005+ X001·X002·X003}·X006+ X001·X004·X007 |
| 18 | | — | X001 | | | | |

PROGRAMMABLE SEQUENCE CONTROLLER

This is a continuation of application Ser. No. 906,986, filed May 17, 1978, now abandoned.

BACKGROUND OF THE INVENTION

1. Field of the Invention

The present invention relates to a sequence control system and in particular to a sequence control system which allows programming of a sequence with the aid of a visible image of a sequence circuit diagram.

2. Description of the Prior Art

With the sequence control, a relay circuit is set up through a combination of relay elements and is destined to make logical decisions in a sequentially repeated manner. The sequence control of the old generation has been implemented in a "hard-wired" configuration. However, as the technologies of electronics have made significant progress lately, the logical decisions executed heretofore by the relay circuit tend to be performed through logical computation which is primarily executed through digital processing particularly with the aid of programmable computer referred to also as a programmable logic controller (PLC). One of the advantages of digital processing is derived from the fact that a control program can be software prepared with instruction codes to thereby facilitate various sequence controls in a flexible manner.

Japanese Laid-Open Patent Application No. 49-135097 laid open Dec. 26, 1974 corresponding to Koyamagi, et al., U.S. Pat. No. 3,944,987, issued Mar. 16, 1976 under the title "Sequence Control System" discloses a sequence control system of a digital logic circuit type in which a desired sequence instruction is read out from a sequence program unit and processing of the sequence is executed by an operation and control circuit. In this prior art system, a memory unit is employed for storing "ON" or "OFF" states of relay points constituted by branching points formed through interconnections of input contacts or relay contacts of output relays of a sequence circuit diagram and for additionally storing a level corresponding to the number of relay points which have been encountered before attaining a given relay point to which access is being made. With such arrangement, it is possible to process appropriately many and various sequence controls. However, the prior art sequence control system needs a memory unit of a great storage capacity for storing the "ON"/"OFF" states of the relay points as well as the level described above, involving great expense and difficulties in practical implementation.

SUMMARY OF THE INVENTION

An object of the invention is to provide an inexpensive sequence control system which eliminates the need for storing "ON"/"OFF" states for every relay point and allows many and various sequences to be controlled easily with the aid of a visible development of a sequence relay circuit connection.

According to an essential feature of the invention, a grid or matrix chart is provided on a screen of a display unit such as a CRT (cathode ray tube) and a plurality of column registers are provided each for each of the column lines of the grid for storing "ON" or "OFF" states of branching points on the associated column line. On the basis of the stored states, a PLC machine instruction is prepared and executed for a desired sequence control.

These and other objects, features and advantages of the invention will become apparent from the following description of the embodiments of the invention when taken in conjunction with the accompany drawings.

BRIEF DESCRIPTION OF THE DRAWINGS

FIG. 8 is a table listing a systematic series of instructions used in an exemplary embodiment of the invention.

FIG. 9 illustrates a programmed sequence circuit diagram according to the invention.

FIG. 10 shows a table of a program for executing the sequence circuit diagram shown in FIG. 9.

FIG. 11 is an illustration of variations in contents in the column registers taking place in the course of executing the program shown in FIG. 10 through the operation and control unit of FIG. 7.

DESCRIPTION OF THE PREFERRED EMBODIMENTS

Figure 1:
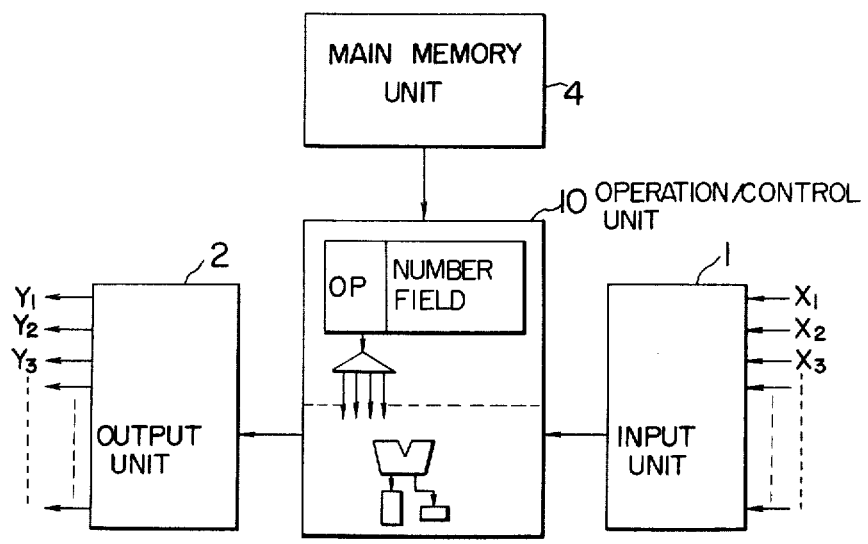
FIG. 1 is a block diagram showing a programmable sequence controller according to the invention.

Referring to FIG. 1 which schematically shows a general arrangement of a sequence controller apparatus according to the invention, the sequence controller comprises four units in total, that is a main memory unit 4 for storing therein a sequence program, an operation and control unit 10 for decoding a sequence instruction and executing a relevant operation, an input unit 1 for fetching an input signal representative of a process state to be controlled and an output unit 2 for producing an output signal for controlling the process.

Figure 2:
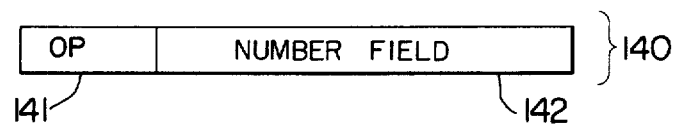
FIG. 2 shows a format of a machine code or instruction employed in a sequence control system according to the invention.

The main memory unit 4 stores therein a sequence program and sends sequence instructions to the operation and control unit 10 in a sequential manner to execute an operation in accordance with the instruction as received. Data information required for the operation is supplied from the input unit 1. The result of the executed operation is transferred to the output unit 2. The input unit 1 supplies to the operation and control unit 10 data relative to the input location identified in a number field of an instruction format, while the output unit 2 furnishes the result of the operation to an output location designated in the number field of the instruction format. In this connection, it is intended that the term "number field" represents the field of an instruction format from which an operand or OP field is excluded. For example, in the case of the instruction format 140 of FIG. 2, the OP field is denoted by 141 while the number field is designated by reference numeral 142.

Figure 3:
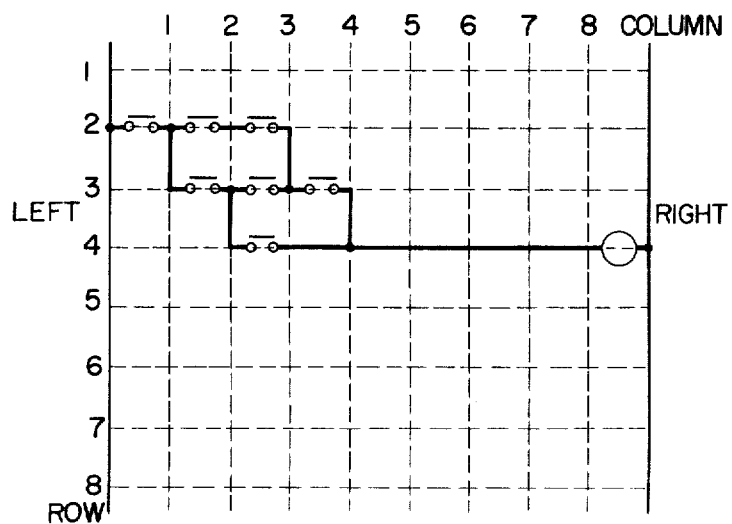
FIG. 3 shows a grid or matrix chart which is displayed on a CRT or the like and used for preparing a sequence circuit diagram in a visible image.
Figure 4:
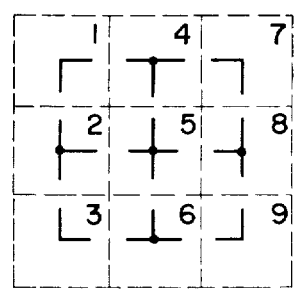
FIG. 4 illustrates a variety of branchings of the sequence shown in FIG. 3.
Figure 5:
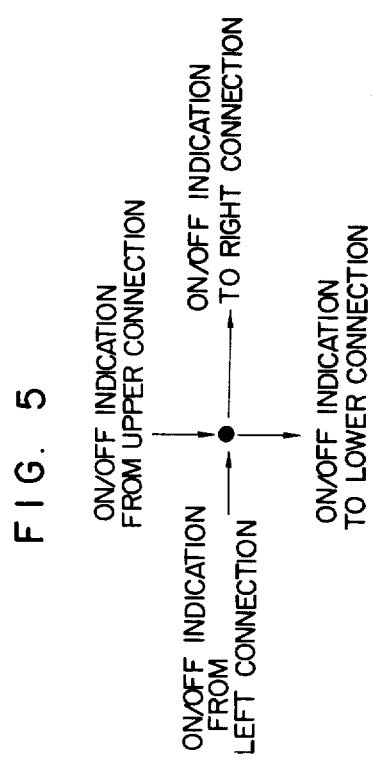
FIG. 5 illustrates branching and connection of sequence carried out according to the teachings of the invention.

In accordance with the teachings of the invention, a grid or matrix such as shown in FIG. 3 is prepared for indication of a relay sequence, on which grid a circuit diagram is to be drawn. In FIG. 3, the leftmost vertical or column line represents a common line at a positive potential, while the rightmost vertical line represents a common line at a ground potential. Contacts and output coils are inscribed on and along the horizontal broken lines or row lines of the grid between successive vertical lines. The vertical broken lines or column lines are destined to be inscribed with branchings in the relay circuit. An example of such inscription is illustrated in FIG. 3. There are nine patterns of the branching in a circuit diagram, as is shown in FIG. 4. In the case of the illustrated embodiment, it is however assumed prescriptively that the circuit current is allowed only to flow at first in the horizontal direction from the left to the right and then in the vertically downward direction. Such order is adopted in linguistical expressions such as writing in the English language or the like, and thus is favorable to human perception. Under the above prescriptive assumption, two branching symbols, that is, a first symbol "⌐" and a ninth symbol "⌐" in the illustration of FIG. 4 are not actually realized. Concerning the seven remaining branches, a summarized illustration is made in FIG. 5. More particularly, in the first place, the inlet to a branching point from the left side gives an indication for connection of "ON" or "OFF" state of a left-adjacent connection to that branching point. Secondly, the inlet to a branching point from the upper side gives an indication for connection of "ON" or "OFF" state of the upper-adjacent connection to that branching point. Next, the exit (outlet) of the branching point to the right gives indication for connection of "ON" or "OFF" state of that branching point to a right-adjacent connection. Finally, the exit of the branching point gives an indication for connection of "ON" or "OFF" state of that branching point to the lower-adjacent connection. The nine kinds of branchings shown in FIG. 4 can be obtained from mere combinations of four directions of connections illustrated in FIG. 5. In a sequence controller in which branchings at the cross points or intersections between the vertical broken lines and horizontal broken lines are to be written, there are provided one-bit registers in one-to-one correspondence with the vertical broken lines or columns. In other words, the branching symbols represent that "ON" or "OFF" states at the branching points of a sequence are stored in the column registers provided in one-to-one correspondence with the columns. Accordingly, in the case of eight columns, there are provided eight column registers. External connection from a branching point is equivalent to the external connection of contents in the associated column register.

Figure 6:
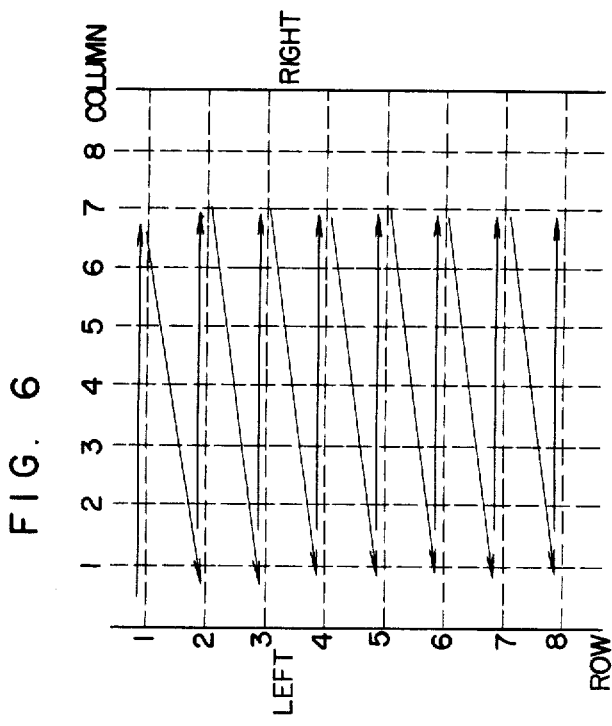
FIG. 6 is a diagram to illustrate the processing order for preparing a sequence circuit diagram.

The executing order of a sequence is at first from the left to the right and then from above to below, as is shown in FIG. 6. The "ON" or "OFF" states of the branching points are stored in the registers provided in one-to-one correspondence with the columns. The sequence is executed starting from the left common line along the first horizontal line or first row in the order of 1st column, 2nd column, . . . , 8th column in the rightward direction. When the execution along the first row has been completed, then a sequence is executed along the second row starting from the left common line in the rightward direction. When the execution of a sequence along the second row is completed, a sequence is carried out along the next row in a similar manner. Thus, this process is repeated.

The column registers are provided in one-to-one correspondence with the individual columns as described above. Accordingly, when the branching point is encountered during execution along one and the same row, the "ON" or "OFF" state at that branching point will be stored in the column register associated with the column at which the branching point exists. Next, when the branching from the upper row is found during execution of the lower row, the "ON" or "OFF" state data stored in the associated column register during the execution of the upper row read out and utilized as the branching information from the upper row. When the contents of the column register as loaded during execution of the upper row have been utilized as the branching information during execution of the lower row, the column register is then cleared and can be used again for storing the "ON" or "OFF" state of the branching point encountered during execution of the lower row. This means that the same number of storage registers as the number of columns will be sufficient for the execution of sequence along any number of rows. In the case of the application illustrated in FIG. 6, provision of eight column registers is sufficient.

Figure 7:
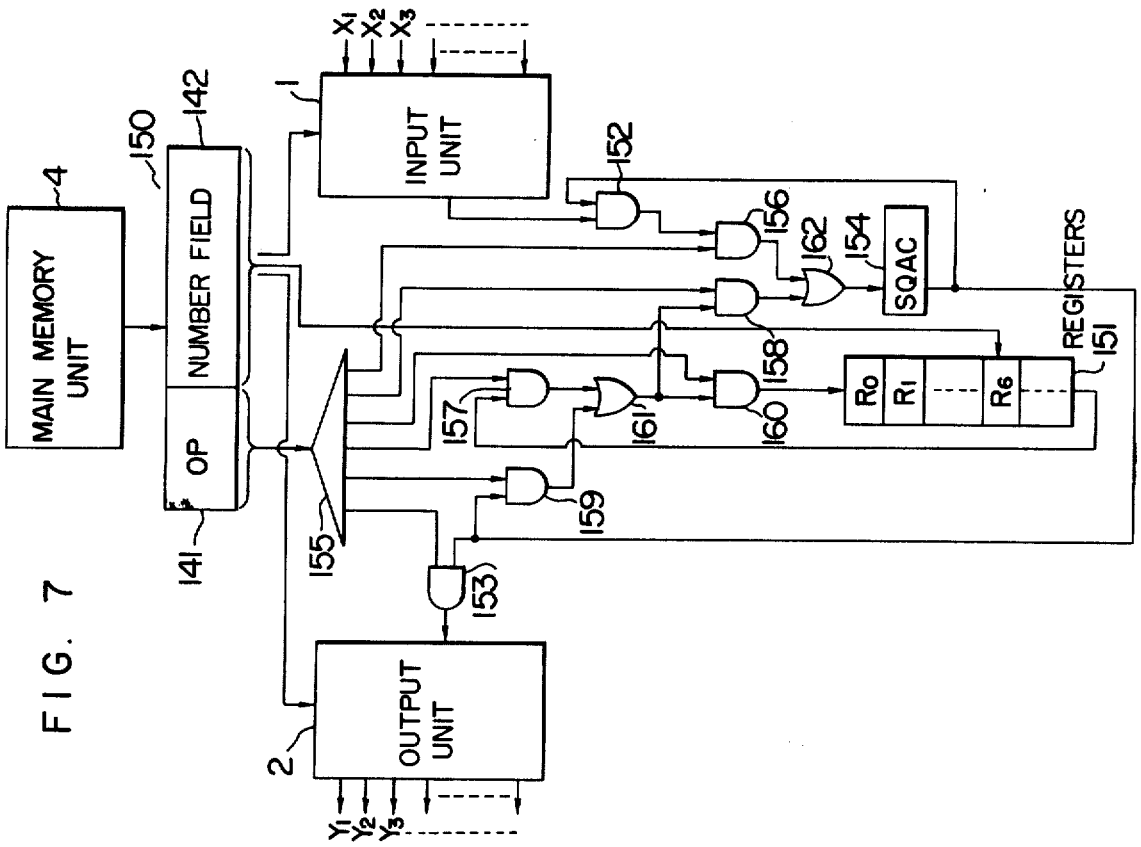
FIG. 7 is a block diagram of an operation and control unit shown in FIG. 1.

FIG. 7 shows an exemplary embodiment of the operation and control unit 10 shown in FIG. 1. The sequence instructions stored in the main memory unit 4 are sequentially read out to be fed to the operation and control unit 10 at which the received instruction is first stored in an instruction register 150. The instruction register 150 is divided into an instruction operand code (OP) field 141 and number field 142. The latter is connected to the input unit 1, the output unit 2 and the column registers 151. The input unit 1 sends information or data at the input location designated by the number field or stage 142 to an AND gate 152. On the other hand, the output unit 2 sends the output from an AND gate 153 to an output location designated by the number field 142.

FIG. 8 shows a table of a systematic series of instructions for use in the exemplary embodiment of the invention now being described. In the table, X represents an input point or location as designated by the number field 142, SQAC corresponds to SQAC 154 shown in FIG. 7 and is constituted by a one-bit flip-flop, Y represents an output point or location designated by the number field 142, and $R_1$ represents one column register as designated by the number field 142. Each of the column registers 151 may be constituted by a one-bit flip-flop and each register is provided for one of the columns or vertical grid lines on a CRT display. Sign "+" indicates a logical sum (inclusive OR operation), while the sign "." represents a logical product (AND operation). Description will be made below of nine types of instructions by referring to FIG. 8.

No. 1 CONTACT INSTRUCTION:

X.SQAC→SQAC

The contact instruction read out from the main memory unit 4 is stored in the instruction register 150. The OP code is decoded by a decoder 155, whereby AND gate 156 is opened. The input point as designated by the number field 142 is loaded through the input unit 1 and subjected to an AND operation at the AND gate 152 with SQAC. The result or the logic product is stored again in SQAC 154 through AND gate 156 and OR gate 162.

No. 2 OUTPUT INSTRUCTION:

(1) SQAC→Y (2) 1→SQAC

The output instruction read out from the main memory unit 4 is stored in the instruction register 150. OP code is decoded by the decoder 155 and the AND gate 153 is opened. Contents of SQAC is sent to the output unit 2 through the AND gate 153 and hence to an output point or location designated by the number field 142. Finally, a binary code "1" is stored in SQAC.

No. 3 BRANCHING INSTRUCTION:

$R_i \rightarrow SQAC$ (Where i is an integer number including zero.)

In a similar manner, OP code 141 of this instruction read out from the main memory unit 4 is decoded, whereby AND gates 157 and 158 are opened. The contents in the i-th flip-flop constituting the column register 151 which is designated by the number field 142 is stored in SQAC 154 through AND gates 157 and 158.

No. 4 BRANCHING INSTRUCTION:

$R_i \rightarrow SQAC$

Similar processing as is in the case of No. 3 instruction is carried out.

No. 5 BRANCHING INSTRUCTION:

(1) $SQAC \rightarrow R_i$
(2) $1 \rightarrow SQAC$

OP code 141 of this instruction read out from the main memory unit 4 is decoded to open AND gates 159 and 160. Contents of SQAC 154 is stored in the i-th flip-flop constituting the column register 151 designated by the number field 142 of the instruction register 150 through the opened AND gates 159 and 160. Finally, a binary code "1" is stored in SQAC flip-flop.

No. 6 BRANCHING INSTRUCTION $SQAC \rightarrow R_i$

This branching instruction of No. 6 read out from the main memory unit 4 is stored in the instruction register 150. OP code of this instruction is decoded by the decoder 155 to open AND gates 159 and 160. The contents of SQAC 154 are transferred to the column register 151 through AND gates 159 and 160 and stored in the i-th flip-flop 154 of the column register 151 designated by the number field 142 of the instruction register 150.

No. 7 BRANCHING INSTRUCTION:

(1) $SQAC \oplus R_i \rightarrow R_i$
(2) $1 \rightarrow SQAC$

The instruction decoded in a similar manner causes AND gates 157, 159 and 160 to be opened. The contents in the column register 151 designated by the number field 142 of the instruction pass through AND gate 157. The contents in SQAC 154 are supplied to OR gate 161 through AND gate 159 where the logical sum is determined from the contents of the designated column register 151 and the contents of SQAC 154. The resulted logical sum is stored again in the column register 151 through AND gate 160. Finally, a binary code "1" is stored in SQAC 154.

No. 8 BRANCHING INSTRUCTION:

$SQAC + R_i \rightarrow R_i$, SQAC

This instruction decoded in a simlar manner causes AND gates 157, 158, 159 and 160 to be opened. The contents in the column register 151 designated by the number field 142 of the instruction pass through AND gate 157. Concurrently, the contents of SQAC 154 pass through AND gate 159 to be inputted to OR gate 161, at which the logical sum is determined from the contents of the column register 151 and SQAC 154. The result of the inclusive-or operation is stored in SQAC 154 and the column register 151 through the gates 158 and 160, respectively.

No. 9 BRANCHING INSTRUCTION:

$SQAC + R_i \rightarrow R_i$, SQAC

Similar operation is carried out as is in the case of the No. 8 instruction.

FIG. 9 shows an example of a sequence circuit. In this figure, X denotes input contacts. The numbers attached to X correspond to the numbers assigned to the input points or locations. Reference letter Y denotes output locations or points with attached numbers representing the identification numbers assigned or alloted to these output locations or points. Reference letters $R_0$ to $R_3$ denote the positions and numbers of the column registers. For example, the branching instructions lying on the same vertical line as $R_0$ are intended to use the flip-flop of the 0-th column register. In the same sense, the 3rd flip-flop is used for the instructions for $R_3$.

FIG. 10 shows a table programming the sequence circuit shown in FIG. 9. The order of programming is at first from the left to the right and then from above to below as described.

FIG. 11 shows a variation in the contents of various registers as brought about as the program shown in FIG. 10 is orderly executed. As will be seen from the table of FIG. 11, the column registers can store effectively "ON" or "OFF" states of the individual branching points thereby to readily output the final state of the sequence circuit.

As will be appreciated from the foregoing description, the invention makes it possible to prepare a relay sequence circuit diagram in an image in a facilitated manner with column registers provided in one-to-one correspondence with the columns of a grid on a display screen without the need of a great number of memory elements for storing "ON" and "OFF" states as well as potential levels of the individual branching points. The invention has thus proposed an improved and inexpensive sequence processor system which is capable of preparing relay sequences as images on the screen of a CRT or the like.

We claim:

1. In a programmable sequence controller which is responsive to the states of a plurality of contacts for controlling one or more output elements, said sequence controller being programmable so as to simulate a circuit formed as a matrix consisting of contacts interconnected in rows, and columns forming branch points between rows of contacts, with said output elements being connected in selected rows of contacts, said matrix including a first voltage node at one marginal column, contacts or output elements between successive ones of said columns, and a second voltage node at the other marginal column, with branch points at selected crosspoints of the rows and the columns at which a signal passing from the first voltage node along the rows is branched along the corresponding column, said programmable sequence controller comprising:

input selection means for selectively providing on-off state signals indicating the operational state of selected contacts;

sequence program storage means for storing programmed sequence instructions which simulate said circuit formed as a matrix;

logical processing means connected to said input selection means and said sequence program storage means for generating an output control signal on the basis of said programmed sequence instructions and said on-off state signals, including (1) second storage means for storing an on-off condition signal relating to the on-off condition of a crosspoint at the output of a contact including initially setting the stored value in accordance with the programmed sequence instructions, (2) first logical operation means connected to said input selection means and said second storage means for producing said on-off condition signals by a first logical operation between the content of said second storage means and an on-off state signal from said input selection means and for storing the result of said first logical operation in said second storage means as the new content thereof in accordance with the execution of said programmed sequence instructions, (3) a plurality of column flip-flops provided in one-to-one correspondence with each of said simulated matrix columns except for said marginal columns thereof for temporarily storing said on-off condition signals for those crosspoints at which there is a branch point in said simulated sequence circuit, and (4) second logical operation means connected to said second storage means and said column flip-flops for producing said on-off condition signals by a second logical operation between the content of said second storage means and the on-off condition signal stored in a column flip-flop and for storing the result of said second logical operation in either said second storage means or said column flip-flops or both as new contents thereof in accordance with the execution of said programmed sequence instructions, and (5) means for providing the result of the logical operation by said first or second logical operation means as said output control signal; and output control means connected to said logical processing means for controlling a selected output element on the basis of said output control signal.

2. A programmable sequence controller according to claim 1, wherein said logical processing means includes an instruction register connected to said sequence program storage means for receiving programmed sequence instructions having an operation code field and an address field, and decoder means connected to receive said operation code field of said instruction register for controlling said first and second logical operation means.

3. A programmable sequence controller according to claim 2, wherein said logical processing means further includes means for applying the address field of said instruction register to said input selection means, said output control means and said plurality of column flip-flops to effect selection control thereof.

4. A programmable sequence controller according to claim 3, wherein said first logical operation means includes an AND gate having one input connected to the output of said input selection means and another input connected to the output of said second storage means, and means responsive to said decoder means for applying the output of said AND gate to the input of said second storage means.

5. A programmable sequence controller according to claim 4, wherein said second logical means includes an OR gate, means responsive to said decoder means for applying the output of said second storage means to one input of said OR gate and the output of a selected column flip-flop to another input of said OR gate, and means for applying the output of said OR gate to said selected column flip-flop and said second storage means.

6. In a programmable sequence controller which is responsive to the states of a plurality of contacts for controlling one or more output elements, said sequence controller being programmable so as to simulate a circuit formed as a matrix consisting of contacts interconnected in rows, and columns forming branch points between rows of contacts, with said output elements being connected in selected rows of contacts, said matrix including a first voltage node at one marginal column, contacts or output elements between successive ones of said columns, and a second voltage node at the other marginal column, with branch points at selected crosspoints of the rows and the columns at which a signal passing from the first voltage node along the rows is branched along the corresponding column, said programmable sequence controller comprising;

input selection means for selectively providing on-off signals indicating the operational state of selected contacts on the basis of an applied address;

sequence program storage means for storing a plurality of programmed sequence instruction, each instruction including an operation code field and a number field;

an instruction register connected to said sequence program storage means for storing instructions;

a decoder responsive to the operation code field of an instruction stored in said instruction register for generating various gate enable signals on selected ones of a plurality of outputs;

a status flip-flop having an input and an output;

a plurality of column flip-flops which are individually enabled in response to an applied address;

output selection means for providing control signals to selected ones of a plurality of output elements on the basis of an applied address;

means for applying the number field of an instruction stored in said instruction register as said applied address to said input selection means, said plurality of column flip-flops and said output selection means;

a first AND gate having an input connected to the output of said input selection means and another input connected to the output of said status flip-flop;

a second AND gate having an input connected to the output of said first AND gate and another input connected to an output of said decoder so as to be enabled by one of said gate enable signals;

a first OR gate having an input connected to the output of said second AND gate and an output connected to the input of said status flip-flop;

a third AND gate having an input connected to the outputs of said column flip-flops and another input connected to an output of said decoder so as to be enabled by one of said gate enable signals;

a second OR gate having an input connected to the output of said third AND gate;

a fourth AND gate having an input connected to the output of said second OR gate and another input connected to an output of said decoder so as to be enabled by one of said gate enable signals, and having an output connected to another input of said first OR gate;

a fifth AND gate having an input connected to the output of said status flip-flop and another input connected to an output of said decoder so as to be enabled by one of said gate enable signals, and an output connected to another input of said second OR gate;

a sixth AND gate having an input connected to the output of said second OR gate and another input connected to an output of said decoder so as to be enabled by one of said gate enable signals, and an output connected to the inputs of said column flip-flops; and a seventh AND gate having an input connected to the output of said status flip-flop and another input connected to an output of said decoder so as to be enabled by one of said gate enable signals, and an output connected to the input of said output selection means.

7. A programmable sequence controller according to claim 6, wherein said plurality of column flip-flops are provided in one-to-one correspondence to each of said simulated matrix columns except for said marginal columns thereof for storing the on-off state of each one of said branch points in accordance with the execution of said programmed sequence instructions.

* * * * *